United States Patent [19]

Norin et al.

[11] Patent Number: 4,503,574
[45] Date of Patent: Mar. 12, 1985

[54] COMBINATION WIRE STRIPPING AND CUTTING TOOL

[75] Inventors: Mats Norin; Lars-Olov Persson, both of Älvdalen, Sweden

[73] Assignee: Pressmaster Tool AB, Alvadel, Sweden

[21] Appl. No.: 514,047

[22] Filed: Jul. 15, 1983

[30] Foreign Application Priority Data

Jul. 19, 1982 [SE] Sweden ................................ 8204396

[51] Int. Cl.³ ............................ B25F 1/00; H02G 1/12
[52] U.S. Cl. ......................................... 7/107; 81/9.5 R
[58] Field of Search .................. 81/9.5 R, 9.5 A, 9.51; 7/107

[56] References Cited

U.S. PATENT DOCUMENTS

| 3,292,462 | 12/1966 | Turecek et al. | 81/9.51 |
| 4,072,069 | 2/1978 | Bieganski | 81/9.5 A |
| 4,083,269 | 4/1978 | Resch | 81/9.51 |
| 4,112,791 | 9/1978 | Wiener | 81/9.5 A |
| 4,395,928 | 8/1983 | Undin et al. | 81/9.5 A |

Primary Examiner—Roscoe V. Parker
Attorney, Agent, or Firm—Fleit, Jacobson, Cohen & Price

[57] ABSTRACT

A tool for stripping surface layers from elongate objects includes an elongate frame, a jaw means which extends along the frame and which is pivotally mounted in the frame and a leg which also extends along the frame and which is pivotally mounted in the frame. When the leg is pivoted towards the frame, the leg is arranged to swing the jaw means towards the frame, via a camming arrangement, against the action of a restoring means. At one end of the tool, the frame and the jaw means have mutually facing clamping surfaces, and a stripping knife means which is arranged between the frame and the jaw means for movement therealong from a starting position adjacent the clamping surfaces. The stripping knife means includes two carriers for a respective one of two stripping knives which are arranged to be brought together by means of the jaw means and which extend transversely relative to the frame. The leg extends from the location at which it is connected to the frame for pivotal movement of the leg, substantially to the region of the part of the jaw means provided with clamping surface adjacent the aforementioned one end of the tool, thereby to cover at least the upper side of the jaw means remote from the frame.

12 Claims, 4 Drawing Figures

COMBINATION WIRE STRIPPING AND CUTTING TOOL

The present invention relates to a tool of the kind intended for stripping surface layers from elongate objects, and in particular for stripping the insulation from the ends of insulated electrical conductors, and of the kind which includes an elongate frame; a jaw means which extends along the frame and which is pivotally connected thereto; a leg which also extends along said frame and which is pivotally mounted in said frame so that when the leg is pivoted towards the frame said leg swings the jaw means towards the frame, via a camming arrangement and against the action of a restoring means, the frame and the jaw means having, at one end of the tool, mutually facing clamping surfaces arranged, when the jaw means is pivoted towards the frame, to firmly clamp an elongate object placed between said clamping surfaces adjacent that end of said elongate object from which a surface layer is to be removed; a stripping knife means which is arranged between the frame and the jaw means and which is displaceable therealong from a starting position located adjacent said clamping surfaces, said stripping knife means including two carriers, one for each of two stripping knives which are located substantially opposite one another and which extend transversely in relation to said frame, each of said carriers co-acting with an associated guide arranged on said frame and on said jaw means respectively, said guides being so arranged that the stripping knives are moved towards each other, so as to cut through the surface layer of an object placed between said clamping surfaces, at a location adjacent said clamping surfaces, when the jaw means is swung towards the frame; and a slide which is connected to the stripping knife means and which is guided for longitudinal movement in said frame, which slide is arranged to be acted upon by said leg, via said camming arrangement, in a manner such that when said leg is swung towards the frame, subsequent to the clamping surfaces and the stripping knife having been brought together, the knife means is moved away from said starting position against the action of said restoring means.

Conventional tools of this kind are relatively bulky and of complicated design, and in certain aspects are functionally and ergonomically unsatisfactory.

Consequently, it is an object of the present invention to provide improvements whereby the disadvantages inherent with conventional tools of the kind described are at least substantially eliminated.

To this end it is proposed in accordance with the invention that with a tool of the kind described, the leg extends from the position at which it is connected to the frame to permit said pivoting of the leg, substantially to the region of that part of the jaw means which is provided with a clamping surface, adjacent said one end of the tool, and covers therewith at least the side of the jaw means remote from said frame. In this way, the outer dimensions of the tool can be greatly reduced in comparison with conventional tools of tong-like construction, while the working zone of the tool is located closer to the locality where the forces are applied, which greatly facilitates work carried out with the tool.

Additional characterizing features of the invention are defined in the following claims, while further advantages afforded by the invention will be apparent from the description hereinafter given with reference to an exemplary, preferred embodiment of the invention illustrated in the accompanying drawings, in which FIG. 1 is a sectional view of a tool according to the invention, the tool being shown in its starting position;

Figure 1:
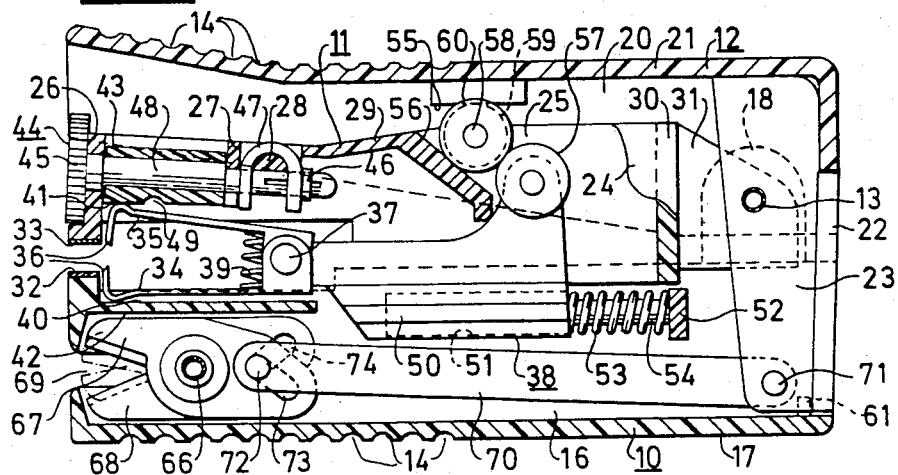
Figure 2:
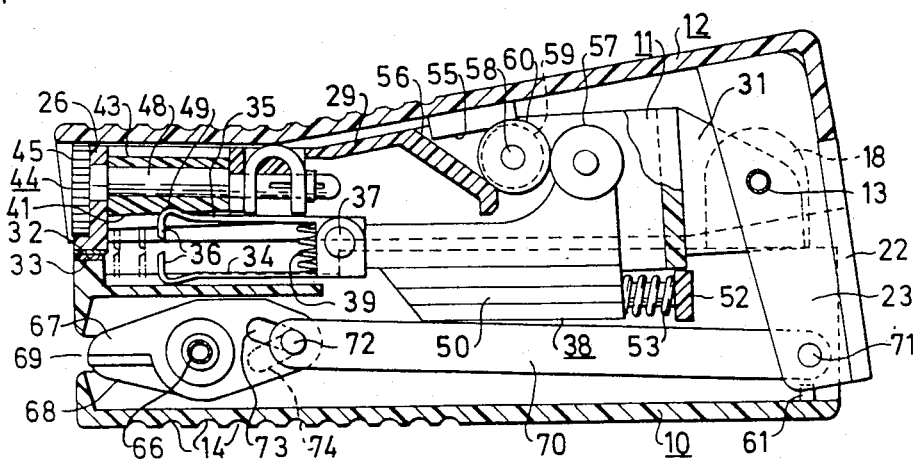
FIG. 2 is a sectional view of the tool, similar to FIG. 1, but with the tool shown in its terminal position, subsequent to having completed a full working cycle but prior to having returned to its starting position.

The tool illustrated in the drawing is especially intended for stripping insulation from the ends of insulated electric conductors and includes an elongate frame 10, a jaw means 11 extending along the frame, and a leg 12 which also extends along said frame, the jaw means 11 and the leg 12 being mounted on a common pivot 13 for pivotal movement relative to the frame 10 and relative to each other. In the illustrated embodiment, the frame 10 and the leg 12 are designed as handles, which are serrated at 14 and, for the purpose of stripping insulation from one end of an insulated electric conductor (not shown), can be moved manually towards each other, from the starting position shown in FIGS. 1 and 4, to the position shown in FIG. 2.

The frame 10 is substantially U-shaped in cross-section and forms the side-pieces 15, 16 and an underside 17 of the tool. At the rear end of the tool, the frame has upstanding lugs, of which one is shown at 18 and which support the pivot shaft 13. Similarly, the leg 12 is also substantially U-shaped in cross-section and forms side-pieces 19, 20, which are through-passed by the shaft 13, and an upper side 21 of the tool. At the rear end of the tool, the leg 12 has a depending end-piece 22, which forms the rear side of the tool, and two depending side portions, of which one is shown at 23 and which are located inwardly of a respective lug 18. The jaw means 11 has arranged thereon side-pieces 24, 25 and cross-pieces 26–30, which extend between the side-pieces 24, 25. Extending rearwardly from the rearmost cross-piece 30 of the jaw means 11 is a lug 31, which is received between the depending portions 23 of the leg 12 and through which the shaft 13 passes.

At the front end of the tool, the frame 10 and the jaw means 11 are provided with mutually facing clamping surfaces 32, 33 which, when the jaw means 11 is pivoted towards the frame 10, are arranged to clamp firmly therebetween part of an insulated electric conductor which is to be stripped of its insulation at one end thereof. Arranged between the frame 10 and the jaw means 11 is a stripping knife means, which is displaceable along said frame and said jaw means from a starting position adjacent the clamping surfaces 32, 33 and which includes carriers 34, 35, each of which supports a respective one of two stripping knives 36 which extend transversely in relation to the frame 10. The carriers 34, 35 are pivotally mounted at the ends thereof remote from the stripping knives 36, on a shaft 37 which extends transversely to the tool in the front end of a slide 38, each of the carriers 34, 35 being held pressed against a respective guide 40, 41 on the frame 10 and jaw means 11 by means of a pressure spring 39 acting between said carriers. In the illustrated embodiment, the guide 40 is formed by the upper side of a part 42 which is formed integrally with the frame 10 and which extends between the side-pieces 15, 16 substantially parallel with the underside 17. The guide 41 is formed by the underside of a part 43, which is arranged between the cross-pieces 26 and 27 of the jaw means 11 and through which extends a peg 44, which is journalled for rotation in the cross-piece 26 and which is guided in a groove in the cross-piece 27. The peg 44 can be rotated by means of a knob 45, which is held pressed against the cross-piece 26 by means of a U-shaped spring 47 carried by the cross-piece 28 and acting between the cross-piece 27 and a shoulder 46 on the peg 44. The cylindrical portion 48 of the peg 44 located between the cross-pieces 26 and 27 is excentric in relation to the remainder of the peg, so that the position of the guide 41 in relation to the clamping surface 33 can be adjusted by rotating the peg 44, with the aid of the knob 45. Further, the distance of the guide surface 41 from the portion 48 decreases rearwardly towards the cross-piece 27, so that in the tool position illustrated in FIG. 2 the guides 40, 41 diverge away from the clamping surfaces 32, 33, and at least the one guide 41 is provided with a recess 49 into which the associated stripping knife carrier is arranged to snap upon termination of the movement of the stripping knife means 34–37 away from the clamping surfaces 32, 33.

The slide 38, to the front end of which the stripping knife means 34–37 is connected, is guided for axial movement in longitudinally extending guide grooves (not shown) in the side-pieces 15, 16 of the frame 10, with the aid of longitudinally extending strips, of which one is shown at 50. Arranged in the slide 38 is a blind bore 51, having its opening at the rear surface of the slide. Acting between the bottom of the blind bore 51 and a cross-piece 52 extending between the side-pieces 15, 16 of the frame 10 is a pressure spring 53, which is guided by a guide peg 54 protruding from the cross-piece 52. The length of the guide peg 54 is so limited as to prevent the peg from reaching the bottom of the bore 51, even in the position of the slide illustrated in FIG. 2. The spring 53 forms a restoring means which attempts, via the slide 38, to restore the stripping knife means 34–37 to the starting position adjacent the clamping surfaces 32, 33, and to swing the jaw means 11 and the leg 12 to their starting position illustrated in FIGS. 1 and 4, via a camming arrangement hereinafter described, the spring 53 being assisted by the spring 39 which strives to swing the frame 10 and the jaw means 11 away from each other, via the stripping knife carriers 34, 35.

In the illustrated embodiment the aforementioned camming arrangement includes rearwardly diverging camming surfaces 55, 56 on the leg 12 and the jaw means 11 respectively, and camming surfaces which are formed by cam rollers journalled on the slide 38, on mutually opposite sides thereof, of which rollers one is shown at 57. Acting between the aforementioned camming surfaces 55, 56, 57 is a roller arrangement 58, 59, 60, which also forms part of the camming arrangement and which is held in position by the side-pieces 24, 25 of the jaw means 11 and by the camming surfaces 55, 56, 57, and comprises a shaft 58 on which there is arranged a centre roller 59 and rollers which flank said centre roller 59 and which are concentric therewith, said rollers having a larger diameter than the roller 59 and of which one is shown at 60. The roller 59 is rotatable relative to the rollers 60, said roller 59 being arranged to roll along the camming surface 55, while the rollers 60 are arranged to roll along both the camming surface 56 and the camming surfaces 57.

As illustrated in the drawing, the leg 12 extends forwardly from the pivot shaft 13 towards the clamping surfaces 32, 33 adjacent the front end of the tool, and therewith covers both the upper side of the jaw means 11 and parts of the long sides of the jaw means or the side-pieces 24, 25, so as to obviate the risk of the user being pinched between the leg 12 and the jaw means 11 when using the tool. The camming arrangement 55–60 is arranged between the forward end of the tool and the shaft 13, where the leg and the jaw means are connected to the frame 10. The reference 61 identifies a shoulder on the frame 10, said shoulder co-acting with the rear piece 22 of the leg 12, to prevent continued pivotal movement of the leg 12 upwards from the position shown in FIGS. 1 and 4. The illustrated arrangement with the leg 12 extending forwardly and with the camming arrangement 55–60 positioned between the shaft 13 and the front end of the tool enables the external dimensions of the tool to be reduced by about one third in relation to a conventional tong-type stripping tool having a rearwardly extending leg, enables the leg 12 and the jaw means 11 to be journalled relative to the frame 10 on a common shaft 13, in the manner described, and enables provision of a completely free roller means 58, 59, 60, which is held in position by the camming surfaces 55, 56, 57, thereby considerably simplifying the structural details of the tool. The fact that the location where force is applied to the tool lies close to the working zone of said tool also simplifies the use of the tool.

Figure 3:
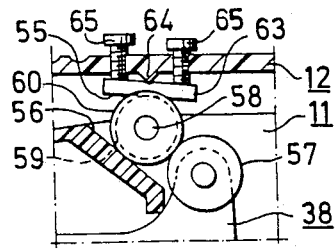
FIG. 3 is a fragmentary sectional view, illustrating a modification to the tool illustrated in FIGS. 1 and 2.
Figure 4:
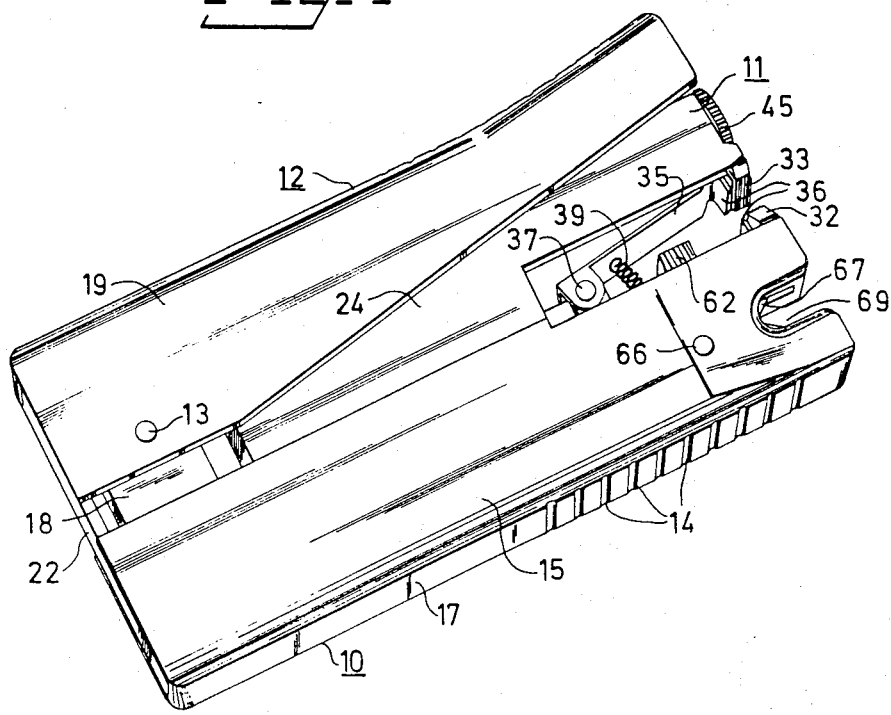
FIG. 4 is a perspecive view of the tool illustrated in FIGS. 1 and 2.

When using the tool, one end of an insulated electric conductor from which the insulation is to be stripped at said one end is placed between the clamping surfaces 32, 33 at the front end of the tool, suitably against a stop abutment 62, shown in FIG. 4 only, said stop abutment being displaceable to selected positions of the frame 10. The leg 12 is then swung towards the frame 10, whereupon the leg 12 swings the jaw means 11 towards the frame 10, via the camming surface 55, the roller arrangement 58, 59, 60 and the camming surface 56, so that the clamping surfaces 32, 33 and the stripping knives 36 are moved together against the action of spring 39, to firmly clamp the conductor between the clamping surfaces 32, 33 and to locally penetrate the insulation on the conductor, the position of the knives 36 relative to the clamping surfaces 32, 33 being adjusted in accordance with the diameter of the conductor to be stripped, by turning the knob 45. During this initial stage of a stripping operation, the pressure spring 53 is able to hold the slide 38 and the stripping knive means 34–37 in the forward position. As the force on the leg 12 is continued, the force exerted by the spring 53 is overcome, so that the cam-roller arrangement 58, 59, 60 upon further downward pivotal movement of the leg 12 will move rearwardly relative to the tool along the camming surfaces 55, 56, whereupon the cam-roller arrangement 58, 59, 60, through the action of the rollers 57, presses the slide 38, and therewith the knife means 34–37, rearwardly, until movement of the leg 12 is stopped by abutment of said leg with the upper side of the jaw means 11. The stripping knives 36, which have thus been brought together, then move rearwardly while stripping the insulation from said one end of the conductor. Because the guides 40, 41 diverge, the edges of the stripping knives move apart slightly during this rearward movement, as indicated by the chain lines in FIG. 2, thereby minimizing the risk of damaging the conductor covered by the insulation. Finally, preferably when stripping of the insulation has been completed, the stripping knife carrier 35 snaps into the recess 49 in the guide 41, whereupon the knives 36 are abruptly parted from one another still further. The recess 49 is so shaped in relation to the shape of the stripping knife carrier 35 and to the force exerted by the spring 39 that it is able to retain the stripping knife means 34–37 and the slide 38 in the rearwardly displaced position against the action of the force exerted by the spring 53, while during the initial stages of the return of the tool to the starting position illustrated in FIGS. 1 and 4, the jaw means 11 is swung away from the frame 10, by the action of spring 39. In this way, the stripping knives 36 are moved further apart in an advantageous manner, before the force exerted by the spring 53 takes dominance, so that said spring is able to move the slide 38 and the stripping knife means 34–37 to the starting position, and is able to swing the leg 12 upwardly relative to the jaw means 11, via the rollers 57, the roller arrangement 58, 59, 60 and the camming surface 55. At the same time, the spring 39 returns the jaw means 11 to its upper starting position illustrated in FIG. 1 via the stripping knife carrier 35, said upper position being determined by stop means (not shown). In order to enable the force by which the jaw means 11 is pressed down against the conductor prior to the slide 38 being moved rearwardly from the position illustrated in FIG. 1 to be set to a desired magnitude, the angle of inclination of one of the camming surfaces 55, 56 may be adjustable. An arrangement suitable in this respect is illustrated in FIG. 3, where the camming surface 55 is provided with a part 63 which can be rocked about a transverse ridge 64, which is formed on the leg 12 and the angle of inclination of which can be adjusted by means of two screws 65.

Incorporated in the frame 10, adjacent the front end of the tool, is a scissor means which is intended for clipping-off a conductor and which is formed by two scissor-like cutters 67, 68 which are pivotally journalled on a common shaft 66 and which are arranged to operate in a recess 69 open towards the front end of the frame 10. The clipping force exerted by the scissor-like means 66, 67 is transmitted via levers, of which one is shown at 70 and which extend within and along the frame 10 between a pivot point 71 at the lower end of a respective one of the depending side portions of the leg 12 and a journal pin 72 which is displaceably arranged for transverse movement in obliquely positioned through-passing grooves 73, 74 in the scissor-like cutters 67, 68, said grooves extending in mutually opposite directions relative to the longitudinal direction of the frame 10. The scissor-like means are thus located close to the working zone of the stripping knife-means 34–37, and are driven in a favourable manner independently of the cam arrangement 55–60 and the slide 38, thereby enabling a firm and reliable clipping function to be obtained.

The invention is not restricted to the aforedescribed and illustrated embodiments, but can be modified within the scope of the invention as set forth in the following claims.

What is claimed is:

1. A tool for stripping surface layers from elongate objects, including an elongate frame; a jaw means which extends along the frame and which is pivotally connected thereto; a leg which also extends along said frame and which is pivotally mounted in said frame so that when the leg is pivoted towards the frame said leg swings the jaw means towards the frame, via a camming arrangement and against the action of a restoring means, the frame and the jaw means having, at one end of the tool, mutually facing clamping surfaces arranged, when the jaw means is pivoted towards the frame, to firmly clamp an elongate object placed between said clamping surfaces adjacent that end of said elongate object from which a surface layer is to be removed; a stripping knife means which is arranged between the frame and the jaw means and which is displaceable therealong from a starting position located adjacent said clamping surfaces, said stripping knife means including two carriers, one for each of two stripping knives which are located substantially opposite one another and which extend transversely in relation to said frame, each of said carriers co-acting with an associated guide arranged on said frame and on said jaw means respectively, said guides being so arranged that the stripping knives are moved towards each other, so as to cut through the surface layer of an object placed between said clamping surfaces, at a location adjacent said clamping surfaces, when the jaw means is swung towards the frame; and a slide which is connected to the stripping knife means and which is guided for longitudinal movement in said frame, which slide is arranged to be acted upon by said leg, via said camming arrangement in a manner such that when said leg is swung towards the frame, subsequent to the clamping surfaces and the stripping knifes having been brought together, the knife means is moved away from said starting position against the action of said restoring means, wherein said leg extends from the position at which it is connected to the frame to permit said pivoting of the leg, substantially to the region of that part of the jaw means which is provided with a clamping surface, adjacent said one end of the tool, and covers at least the upper side of the jaw means remote from said frame.

2. A tool according to claim 1, wherein said leg substantially encloses both the upper side of the jaw means and parts of the long sides of said jaw means.

3. A tool according to claim 1, wherein said leg and the jaw means are pivotable relative to the frame about a common pivot shaft.

4. A tool according to claim 1, wherein said camming arrangement is arranged between the location at which the leg and the jaw means respectively are pivotally connected to the frame and said one end of the tool.

5. A tool according to claim 4, wherein the camming arrangement includes a roller arrangement which is active between camming surfaces on the leg, the jaw means and the slide, and is positioned by said camming surfaces.

6. A tool according to claim 5, wherein the roller arrangement includes at least two concentric rollers which are journalled on a common shaft and which are rotatable relative to one another, each of said rollers being arranged to co-act with solely one of the camming surfaces on the leg and the jaw means.

7. A tool according to claim 5, wherein the angle of inclination of at least one of said camming surfaces on the leg and the jaw means is adjustable.

8. A tool according to claim 7, wherein the angle of inclination of the camming surface on the leg is adjustable.

9. A tool according to claim 1, wherein adjacent said one end of the tool said frame incorporates a scissor-like means comprising two scissor cutters pivotally mounted on a common shaft, the clipping force being transmitted via at least one lever, which projects into the frame and which is rigidly mounted on the leg, and at least one link which is embodied in the frame and which extends between the outer end of the lever and a peg, which is arranged for movement in its transverse direction in oppositely inclined grooves in the scissor cutters.

10. A tool according to claim 1, wherein the guides for said stripping knife carriers, with the clamping surfaces brought together, diverge in a direction away from said clamping surfaces.

11. A tool according to claim 10, wherein the distance between the guides is also adjustable.

12. A tool according to claim 1, wherein the stripping knife carriers are journalled at their respective ends remote from the stripping knives, for pivotal movement relative to one another, and are spring-biassed in a direction away from each other, and wherein at least one of said guides is provided with a recess into which the associated stripping knife carrier is arranged to snap in order to widen the distance between the cutting edges of the stripping knives at the end of the movement of the stripping knife means away from said clamping surfaces, said recess being shaped to retain the cutting knife means while the jaw means is pivoted away from the frame during the initial stage of the restoration of the tool to its working position, in response to said spring bias.

* * * * *